United States Patent
Zhong et al.

(10) Patent No.: US 7,245,478 B2
(45) Date of Patent: Jul. 17, 2007

(54) ENHANCED BREAKDOWN VOLTAGE ELECTRODE

(75) Inventors: Linda Zhong, San Diego, CA (US); Xiaomei Xi, Carlsbad, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 11/178,192

(22) Filed: Jul. 8, 2005

(65) Prior Publication Data

US 2007/0008677 A1    Jan. 11, 2007

Related U.S. Application Data

(60) Provisional application No. 60/601,793, filed on Aug. 16, 2004, provisional application No. 60/662,113, filed on Mar. 14, 2005.

(51) Int. Cl.
 *H01G 9/00*    (2006.01)
(52) U.S. Cl. ............... 361/502; 361/503; 423/445 R
(58) Field of Classification Search ............... 361/502, 361/507–509, 511–512, 516–520, 528–530, 361/532, 535–538, 25.03; 29/25.03; 423/44 R, 423/445 R
See application file for complete search history.

(56) References Cited

U.S. PATENT DOCUMENTS

| | | | |
|---|---|---|---|
| 2,692,210 A * | 10/1954 | Burnham ............... | 427/80 |
| 3,528,955 A | 9/1970 | Lippman et al. | |
| 3,864,124 A | 2/1975 | Breton et al. | |
| 4,129,633 A | 12/1978 | Biddick | |
| 4,153,661 A | 5/1979 | Ree et al. | |
| 4,175,055 A | 11/1979 | Goller et al. | |
| 4,177,159 A | 12/1979 | Singer | |
| 4,194,040 A | 3/1980 | Breton et al. | |
| 4,287,232 A | 9/1981 | Goller et al. | |
| 4,313,972 A | 2/1982 | Goller et al. | |
| 4,317,789 A | 3/1982 | Groukt et al. | |
| 4,320,185 A | 3/1982 | Bernstein et al. | |
| 4,336,217 A | 6/1982 | Sauer | |
| 4,354,958 A | 10/1982 | Solomon | |
| 4,383,010 A | 5/1983 | Spaepen | |

(Continued)

FOREIGN PATENT DOCUMENTS

EP    0617441 A1    9/1994

(Continued)

*Primary Examiner*—Eric W. Thomas
(74) *Attorney, Agent, or Firm*—Hensley Kim & Edgington, LLC

(57) ABSTRACT

Particles of active electrode material are made by blending and fibrillizing (i.e., fibrillating) a mixture of activated carbon, conductive carbon, and fibrillizable binder. In selected embodiments, chloride level in the activated carbon is relatively low, a small amount of conductive carbon with low impurity levels and high conductivity is used, and the binder is inert. For example, chloride content of the activated carbon is below 50 ppm, and total impurities in the conductive carbon are below 120 ppm. The mixture may include about 10% of PTFE and 0.5% or less of conductive carbon. Blending and fibrillization may be performed without solvents. The fibrillized particles are dried, blended again to reduce clumping, and used to make active electrode material film. The film is attached to a current collector to obtain an electrode for use in various electrical devices, including double layer capacitors. The electrode increases breakdown voltage of the capacitor electrolyte.

8 Claims, 2 Drawing Sheets

U.S. PATENT DOCUMENTS

| | | | |
|---|---|---|---|
| 4,500,647 A | 2/1985 | Solomon et al. | |
| 4,556,618 A | 12/1985 | Shia | |
| 4,822,701 A * | 4/1989 | Ballard et al. | 429/313 |
| 4,895,775 A | 1/1990 | Kato et al. | |
| 4,917,309 A | 4/1990 | Zander et al. | |
| 4,992,910 A | 2/1991 | Evans | |
| 5,100,747 A | 3/1992 | Hayashida et al. | |
| 5,150,283 A | 9/1992 | Yoshida et al. | |
| 5,168,019 A | 12/1992 | Sugeno | |
| 5,198,313 A | 3/1993 | Juergens | |
| 5,393,617 A | 2/1995 | Klein | |
| 5,450,279 A * | 9/1995 | Yoshida et al. | 361/502 |
| 5,478,363 A | 12/1995 | Klein | |
| 5,478,668 A | 12/1995 | Gozdz et al. | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,682,288 A | 10/1997 | Wahni | |
| 5,706,165 A | 1/1998 | Saito et al. | |
| 5,707,763 A | 1/1998 | Shimizu et al. | |
| 5,786,555 A | 7/1998 | Saito et al. | |
| 5,786,980 A * | 7/1998 | Evans | 361/502 |
| 5,849,431 A | 12/1998 | Kita et al. | |
| 5,955,215 A * | 9/1999 | Kurzweil et al. | 429/41 |
| 5,973,912 A | 10/1999 | Kibi et al. | |
| 6,022,436 A | 2/2000 | Koslow et al. | |
| 6,031,712 A | 2/2000 | Kurihara et al. | |
| 6,127,474 A | 10/2000 | Andelman | |
| 6,181,545 B1 | 1/2001 | Amatucci et al. | |
| 6,207,251 B1 | 3/2001 | Balsimo et al. | |
| 6,236,560 B1 | 5/2001 | Ikeda et al. | |
| 6,245,464 B1 | 6/2001 | Spillman et al. | |
| 6,301,092 B1 * | 10/2001 | Hata et al. | 361/321.2 |
| 6,304,426 B1 * | 10/2001 | Wei et al. | 361/502 |
| 6,310,756 B1 | 10/2001 | Miura et al. | |
| 6,349,027 B1 | 2/2002 | Suhara et al. | |
| 6,359,769 B1 | 3/2002 | Mushiake et al. | |
| 6,403,257 B1 | 6/2002 | Christian et al. | |
| 6,447,669 B1 | 9/2002 | Lain | |
| 6,459,564 B1 | 10/2002 | Watanabe et al. | |
| 6,589,299 B2 | 7/2003 | Missling et al. | |
| 6,614,646 B2 | 9/2003 | Bogaki et al. | |
| 6,627,252 B1 | 9/2003 | Nanjundiah et al. | |
| 6,697,249 B2 | 2/2004 | Maletin et al. | |
| 6,795,297 B2 | 9/2004 | Iwaida et al. | |
| 6,831,826 B2 | 12/2004 | Iwaida et al. | |
| 6,841,594 B2 | 1/2005 | Jones et al. | |
| 6,847,517 B2 | 1/2005 | Iwaida et al. | |
| 6,906,911 B2 | 6/2005 | Ikeda et al. | |
| 6,912,116 B2 | 6/2005 | Takahashi et al. | |
| 6,918,991 B2 | 7/2005 | Chickering, III et al. | |
| 2002/0039275 A1 | 4/2002 | Takeuchi et al. | |
| 2002/0096661 A1 | 7/2002 | Shinozaki et al. | |
| 2002/0122985 A1 | 9/2002 | Sato et al. | |
| 2002/0150812 A1 | 10/2002 | Kaz et al. | |
| 2002/0163773 A1 | 11/2002 | Niori et al. | |
| 2002/0167784 A1 | 11/2002 | Takatami et al. | |
| 2003/0030963 A1 | 2/2003 | Tennent et al. | |
| 2003/0113636 A1 | 6/2003 | Sano et al. | |
| 2003/0157314 A1 | 8/2003 | Penneau et al. | |
| 2003/0175494 A1 | 9/2003 | Penneau et al. | |
| 2003/0186110 A1 | 10/2003 | Sloop | |
| 2005/0064289 A1 | 3/2005 | Suzuki et al. | |
| 2005/0266298 A1 | 12/2005 | Mitchell et al. | |
| 2005/0266990 A1* | 12/2005 | Iwasaki et al. | 502/416 |
| 2006/0035785 A1* | 2/2006 | Tanaka | 502/416 |

FOREIGN PATENT DOCUMENTS

| | | |
|---|---|---|
| EP | 1009058 A1 | 6/2000 |
| EP | 1126536 A2 | 8/2001 |
| JP | 01241811 A * | 9/1989 |
| JP | 04067610 A | 3/1992 |
| JP | 04088619 | 3/1992 |
| JP | 09183604 A * | 7/1997 |

* cited by examiner

ENHANCED BREAKDOWN VOLTAGE ELECTRODE

PRIORITY INFORMATION

This application is related and claims priority to commonly assigned Provisional Application 60/601,793 filed Aug. 16, 2004, Provisional Application 60/662,113, filed Mar. 14, 2005, which is incorporated herein by reference.

FIELD OF THE INVENTION

The present invention generally relates to fabrication of electrodes. More specifically, the present invention relates to porous electrodes and to energy storage devices, such as electrochemical double layer capacitors, made using porous electrodes immersed in an electrolytic solution.

BACKGROUND

Electrodes are widely used in many devices that store electrical energy, including primary (non-rechargeable) battery cells, secondary (rechargeable) battery cells, fuel cells, and capacitors. Important characteristics of electrical energy storage devices include energy density, power density, maximum charging rate, internal leakage current, equivalent series resistance (ESR), and durability, i.e., the ability to withstand multiple charge-discharge cycles. For a number of reasons, double layer capacitors, also known as supercapacitors and ultracapacitors, are gaining popularity in many energy storage applications. The reasons include availability of double layer capacitors with high power densities (in both charge and discharge modes), and with energy densities approaching those of conventional rechargeable cells.

Double layer capacitors use electrodes immersed in an electrolyte (an electrolytic solution) as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow through the electrolyte between the electrodes in both directions. As discussed below, double layers of charges are formed at the interfaces between the solid electrodes and the electrolyte. Double layer capacitors owe their descriptive name to these layers.

When electric potential is applied between a pair of electrodes of a double layer capacitor, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the double layer capacitors through orientation and alignment of molecules of the electrolytic solution under influence of the electric field induced by the potential. This mode of energy storage, however, is secondary.

In comparison to conventional capacitors, double layer capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material, having very large effective surface area per unit volume. Because capacitance is directly proportional to the electrode area and inversely proportional to the widths of the charge separation layers, the combined effect of the large effective surface area and narrow charge separation layers is capacitance that is very high in comparison to that of conventional capacitors of similar size and weight. High capacitance of double layer capacitors allows the capacitors to receive, store, and release large amounts of electrical energy.

Electrical energy stored in a capacitor is determined using a well-known formula:

$$E = \frac{C * V^2}{2}. \tag{1}$$

In this formula, E represents the stored energy, C stands for the capacitance, and V is the voltage of the charged capacitor. Thus, the maximum energy ($E_m$) that can be stored in a capacitor is given by the following expression:

$$E_m = \frac{C * V_r^2}{2}, \tag{2}$$

where $V_r$ stands for the rated voltage of the capacitor. It follows that a capacitor's energy storage capability depends on both (1) its capacitance, and (2) its rated voltage. Increasing these two parameters is therefore important to capacitor performance. Indeed, because the total energy storage capacity varies linearly with capacitance and as a second order of the voltage rating, increasing the voltage rating is the more important of the two objectives.

Voltage ratings of double layer capacitors are generally limited by chemical reactions (e.g., reduction or oxidation) and breakdown that take place within the electrolytic solution in presence of an electric field induced between capacitor electrodes. Electrolytes currently used in double layer capacitors are of two kinds. The first kind includes aqueous electrolytic solutions, for example, potassium hydroxide and sulfuric acid solutions.

Double layer capacitors may also be made with organic electrolytes, such as propylene carbonate (PC) solution, acetonitrile (AN) solution, certain liquid crystal electrolytes, and even solid electrolytes.

Double layer capacitor cells manufactured using organic electrolytes and activated carbon are typically rated at or below 2.5 volts in order to achieve a commercially acceptable number of charge-discharge cycles. Even small increases in the rated voltage above 2.5 volts tend to reduce substantially the number of charge-discharge cycles that the capacitors can withstand without significant deterioration in performance. As an approximation, every 100 millivolt increase in the rated capacitor voltage results in halving of the number of charge-discharge cycles that the capacitor can reliably withstand.

The 2.5 volt rating is considerably below theoretical breakdown voltage of organic electrolytes. With noble metal (inert) electrodes, such as platinum electrodes, breakdown voltages approaching 4.0 volts and possibly higher may be achievable. One part of the low breakdown voltage problem therefore lies in the carbon used in the electrodes of double layer capacitors. Pure carbon tends to have relatively high surface energy states, thereby contributing to the decrease in the electrolyte breakdown voltage. Nevertheless, according to some calculations, double layer capacitors made with an organic electrolyte and activated carbon should perform reliably at voltages ranging to about 3.2–3.5 volts. As noted above, achieving this range has been an elusive goal because of early decomposition and breakdown of the electrolyte.

It would be desirable to increase actual breakdown voltage of electrolyte in electrical devices with porous electrodes, such as double layer capacitors. It would also be desirable to improve reliability and durability of double layer capacitors, as measured by the number of charge-discharge cycles that a double layer capacitor can withstand without a significant deterioration in its operating characteristics. It would further be desirable to provide porous electrodes that, when immersed in an electrolyte, do not lower the breakdown voltage of the electrolyte to the same extent as known porous electrodes. Additionally, it would be desirable to provide electrical devices, such as double layer capacitors, using these electrodes.

SUMMARY

A need thus exists for porous electrodes that, when immersed in electrolyte, do not lower the electrolyte's breakdown voltage to the same extent as conventional porous electrodes. A need also exists for methods and materials for making such porous electrodes, and for electrical devices, including double layer capacitors, using such electrodes.

Various embodiments of the present invention are directed to methods, electrodes, electrode assemblies, and electrical devices that satisfy one or more of these needs. An exemplary embodiment of the invention herein disclosed is a method of making particles of active electrode material. In accordance with the method, particles of activated carbon, conductive carbon, and fibril-forming binder may be mixed and fibrillized. In aspects of the invention, the activated carbon particles have chloride content not exceeding about 50 parts per million. In aspects of the invention, the conductive carbon includes low contamination level and/or high conductivity conductive carbon particles.

In accordance with aspects of the invention, the proportion of the conductive particles in the mixture does not exceed about 0.5 percent by weight.

In accordance with aspects of the invention, the binder is an inert binder, such as PTFE. The proportion of the inert binder may be between 9 and 11 percent by weight, for example, about 10 percent by weight.

In accordance with aspects of the invention, mixing of the activated carbon, conductive carbon, and binder is performed by dry-blending these ingredients.

In accordance with aspects of the invention, fibrillizing is carried out by subjecting the mixture of the activated carbon, conductive carbon, and binder to a non-lubricated high-shear force technique.

In accordance with aspects of the invention, films of active electrode material are made from the particles of active electrode material made as is described in the preceding paragraphs. The films are attached to current collectors and used in various electrical devices, for example, in double layer capacitors.

In one embodiment, a method of making particles of active electrode material comprises providing activated carbon with chloride content not exceeding about 50 parts per million; providing binder; mixing the activated carbon and the binder to obtain a mixture; and fibrillizing the binder in the mixture. The method may further comprise providing conductive carbon particles. In one embodiment, the proportion of the conductive carbon particles in the mixture does not exceed about 0.5 percent by weight. In one embodiment, the binder comprises PTFE; and the proportion of the binder in the mixture is about 10 percent by weight. In one embodiment, the proportion of the conductive carbon particles in the mixture is between 0.1 percent and 1 percent by weight; and the proportion of binder in the mixture is between 9 and 11 percent by weight. In one embodiment, the step of mixing comprises dry blending the activated carbon, conductive carbon, and the binder. In one embodiment, the step of fibrillizing is performed without processing additives.

In one embodiment, an electrode comprises a current collector; and a film of active electrode material attached to the current collector, wherein the active electrode material comprises particles of activated carbon with a chloride content of less than about 50 ppm. The active electrode material may comprise binder, wherein the proportion of binder in the active electrode material is between 9 and 11 percent by weight. The active electrode material may comprise conductive carbon particles, and wherein the proportion of the conductive carbon particles in the active electrode material is between 0.1 percent and 1 percent by weight. In one embodiment, the chloride content of the activated carbon is less than about 30 ppm chloride.

In one embodiment, a method of making particles of active electrode material comprises providing activated carbon with chloride content not exceeding about 50 parts per million; providing low contamination level conductive carbon particles; providing fibril-forming binder; mixing the activated carbon, the conductive carbon, and the binder to obtain a mixture; and fibrillizing the mixture. In one embodiment, a proportion of the conductive carbon particles in the mixture does not exceed about 0.5 percent by weight. In one embodiment, a proportion of the binder in the mixture is about 10 percent by weight. In one embodiment, a proportion of the binder in the mixture is between 9 and 11 percent by weight. In one embodiment, the binder comprises PTFE. In one embodiment, the step of providing activated carbon comprises providing activated carbon with chloride content less than about 30 parts per million.

In one embodiment, an electrochemical double layer capacitor comprises a first electrode comprising a first current collector and a first film of active electrode material, the first film comprising a first surface and a second surface, the first current collector being attached to the first surface of the first film; a second electrode comprising a second current collector and a second film of active electrode material, the second film comprising a third surface and a fourth surface, the second current collector being attached to the third surface of the second film; a porous separator disposed between the second surface of the first film and the fourth surface of the second film; a container; an electrolyte; wherein the first electrode, the second electrode, the porous separator, and the electrolyte are disposed in the container; the first film is at least partially immersed in the electrolyte; the second film is at least partially immersed in the electrolyte; the porous separator is at least partially immersed in the electrolyte; each of the first and second films comprises a mixture of activated carbon with chloride content not exceeding about 50 parts per million. In one embodiment, the electrode films further comprise conductive carbon, wherein the proportion of the conductive carbon in the mixture is about 0.5 percent by weight. In one embodiment, the electrode films further comprise binder, wherein the proportion of binder in the mixture is between about 9 percent and 11 percent by weight. In one embodiment, the films are attached to respective collectors via a conductive adhesive layer.

These and other features and aspects of the present invention will be better understood with reference to the following description, drawings, and appended claims.

DETAILED DESCRIPTION

Figure 1:
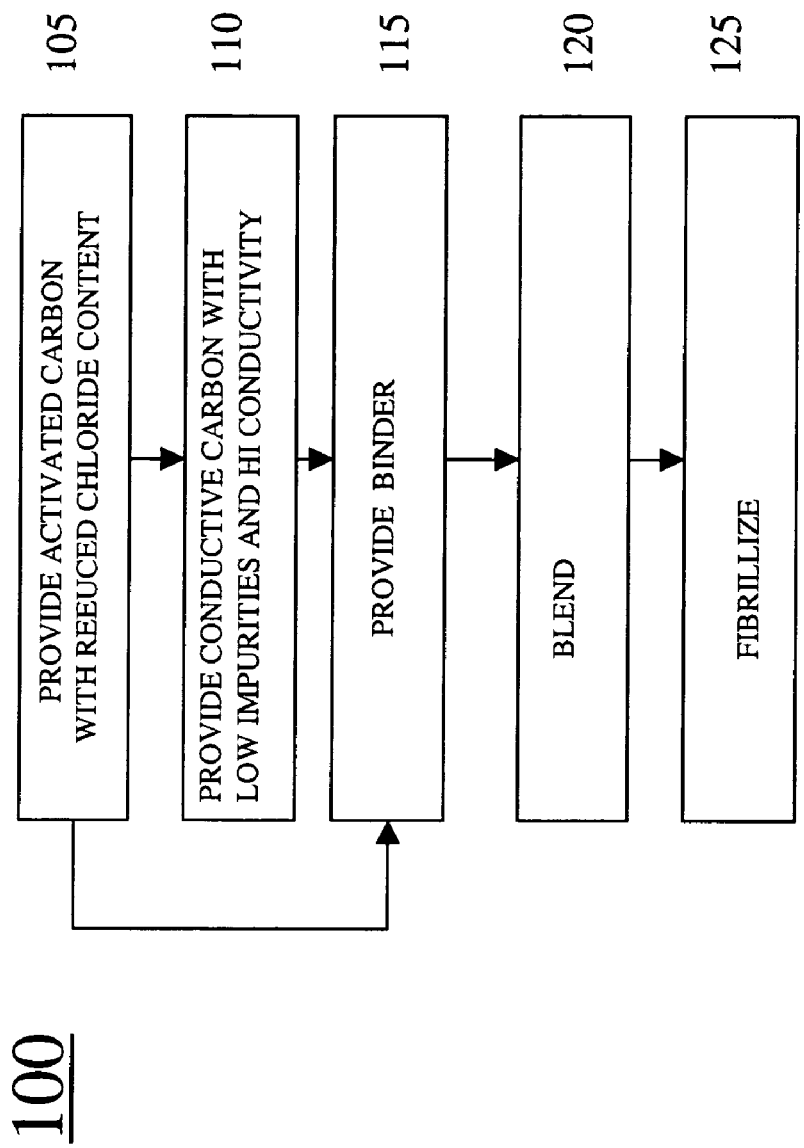
FIG. 1 illustrates selected steps of a process for making fibrillized particles of active electrode material, in accordance with some aspects of the present invention.

In this document, the words "embodiment" and "variant" refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. Similarly, "some embodiments," "certain embodiments," or similar expressions used in one place or context may refer to one or more particular apparatus, process, or article of manufacture; the same or similar expressions in a different place or context may refer to the same or a different apparatus, process, or article of manufacture. The expression "alternative embodiment" and similar phrases are used to indicate one of a number of different possible embodiments. The number of possible embodiments is not necessarily limited to two or any other quantity. Characterization of an embodiment as "exemplary" means that the embodiment is used as an example. Such characterization does not necessarily mean that the embodiment is a preferred embodiment; the embodiment may but need not be a currently preferred embodiment.

The expression "active electrode material" and similar phrases signify material that enhances the function of the electrode beyond simply providing a contact or reactive area approximately the size of the visible external surface of the electrode. In a double layer capacitor electrode, for example, a film of active electrode material includes particles with high porosity, so that the surface area of the electrode exposed to an electrolyte in which the electrode is immersed is increased well beyond the area of the visible external surface; in effect, the surface area exposed to the electrolyte becomes a function of the volume of the film made from the active electrode material.

The meaning of the word "film" is similar to the meaning of the words "layer" and "sheet"; "film" does not necessarily imply a particular thickness of the material.

When used to describe making of active electrode material film, the terms "powder," "particles," and the like refer to a plurality of small granules. As a person skilled in the art would recognize, particulate material is often referred to as a powder, grain, specks, dust, or by other appellations. References to carbon and binder powders throughout this document are thus not meant to limit the invention.

The references to "fibrillizable binder" and "fibril-forming binder" within this document are intended to convey the meaning of polymers, co-polymers, and similar ultra-high molecular weight substances capable of fibrillation. Such substances are often employed as binder for promoting cohesion in loosely-assembled particulate materials, i.e., active filler materials that perform some useful function in a particular application. "Fibrillized" or "fibrillated" particles are particles of active electrode material mixed with fibrillizable binder and, optionally, with a conduction promoter such as conductive carbon (and possibly other substances), and that have undergone a fibrillation process, such as exposure to high-shear forces.

The words "calender," "nip," "laminator," and similar expressions mean a device adapted for pressing and compressing. Pressing may be, but is not necessarily, performed using rollers. When used as verbs, "calender" and "laminate" mean processing in a press, which may, but need not, include rollers.

The word "chloride" refers to anions (negatively charged ions) formed when the element chlorine picks up an extra electron. Chloride also refers to chemical compounds in which one or possibly more than one atoms of the element chlorine are covalently bonded in a molecule. A chloride compound may be an organic or an inorganic compound.

Other and further definitions and clarifications of definitions may be found throughout this document. The definitions are intended to assist in understanding this disclosure and the appended claims, but the scope and spirit of the invention should not be construed as strictly limited to the definitions, or to the particular examples described in this specification.

Reference will now be made in detail to several embodiments of the invention that are illustrated in the accompanying drawings. Same reference numerals are used in the drawings and the description to refer to the same parts or steps. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention.

Referring more particularly to the drawings, FIG. 1 illustrates selected steps of a dry process 100 for making fibrillized particles of active electrode material. Although the process steps are described serially, certain steps may also be performed in conjunction or in parallel, in a pipelined manner, or otherwise. There is no particular requirement that the steps be performed in the same order in which this description lists them, except where explicitly so indicated, otherwise made clear from the context, or inherently required. Not all illustrated steps may be strictly necessary, while other optional steps may be added to the process 100. A high level overview of the process 100 is provided immediately below. A more detailed description of the steps of the process 100 and variants of the steps is provided following the overview.

In step 105, activated carbon particles with reduced chloride content are provided. In step 110, conductive carbon particles with low contamination level and high conductivity are provided. In step 115, fibrillizable binder is provided. In one embodiment the fibrillizable binder comprises polytetraflouroethylene (also known as PTFE or Teflon®). In step 120, the activated carbon, conductive carbon, and binder are mixed together. Alternatively, in certain embodiments may be omitted.

We now turn to a more detailed description of the individual steps of the process 100, beginning with the step 105 in which activated carbon particles with reduced chloride content are provided. It has been identified that when electrodes are made from activated carbon particles with reduced chloride content, breakdown voltage of the electrolyte in which the electrodes are immersed tends to be higher than in the case of activated carbon particles with a relatively higher chloride content. Furthermore, other components that may be used in the manufacture of electrodes may benefit from reduced chloride content, for example, a paper separator that may degrade when exposed to excessive amounts of chloride. Accordingly, in some embodiments the activated carbon particles provided in the step 105 have chloride content of 50 parts per million (ppm) or less. In some more specific embodiments, chloride content of the activated carbon particles is less than about 30 ppm.

It has also been identified when the level of contaminants in conductive carbon of an electrode tends is reduced, the breakdown voltage of electrolyte in which an electrode comprising the conductive carbon can be increased. Thus, when conductive carbon particles are provided in the step 110 they desirably comprise a low total level of contaminants. The conductive particles also preferably have a relatively high conductivity. In one embodiment, total impurity content (other than ash) in conductive carbon is below about 120 ppm. Table 1 below shows typical contaminant levels in conductive carbon utilized by the present invention.

TABLE 1

| IMPURITY | UNIT | IMPURITY LEVEL (Typical) |
|---|---|---|
| ash | % | 0.01 |
| Al | ppm | 0.8 |
| Ba | ppm | <0.2 |
| Ca | ppm | 8.4 |
| Cd | ppm | <0.1 |
| Co | ppm | <0.1 |
| Cr | ppm | <2 |
| Cu | ppm | <0.2 |
| Fe | ppm | 10 |
| Hg | ppm | 1.3 |
| K | ppm | 0.5 |
| Mg | ppm | 1 |
| Mn | ppm | 0.1 |
| Mo | ppm | <0.5 |
| Na | ppm | 8 |
| Ni | ppm | 0.5 |
| P | ppm | <3 |
| Pb | ppm | <1 |
| S | ppm | 70 |
| Sb | ppm | <4 |
| Se | ppm | <0.5 |
| Si | ppm | 2 |
| Sn | ppm | <3 |
| Sr | ppm | <0.2 |
| Ti | ppm | <0.1 |
| V | ppm | <0.2 |
| Zn | ppm | 0.5 |

Conductive carbon particles with substantially similar or lower contamination levels and conductivities that are substantially similar to or higher than that of TABLE 1 may be processed to obtain such characteristics using techniques known to those skilled in the art. Thus, it should be understood that the invention is not limited to particular brands of carbon or other materials.

In step 115, fibrillizable binders may be provided, for example: PTFE in granular powder form, various fluoropolymer particles, polypropylene, polyethylene, co-polymers, and other polymer blends. It has been identified, that the use of inert binders such as PTFE, tends to increase the voltage that an electrode comprising such inert binder can be operated at. Such increase occurs in part due to reduced interactions with electrolyte that the electrode is subsequently immersed in. In one embodiment, typical diameters of the PTFE particles are in the five hundred micron range.

In the step 120, activated carbon particles, conductive carbon particles, and/or binder particles are blended or otherwise mixed together. In various embodiments, proportions of activated carbon, conductive carbon, and binder are as follows: 85–92 percent by weight of activated carbon, 5–15 percent by weight of PTFE, and 0–10 percent by weight of conductive carbon. A preferred embodiment contains about 89.5 percent of activated carbon, about 10 percent of PTFE, and about 0.5 percent of conductive carbon. Other ranges are within the scope of the present invention as well. Note that all percentages are given by weight. Conductive carbon is preferably held to a low percentage of the mixture because it has been identified that increased proportion of conductive carbon tends to lower the breakdown voltage of electrolyte in which an electrode made from the conductive carbon particles is subsequently immersed.

In a preferred embodiment of the process 100, the blending step 120 is a "dry-blending" step, i.e., blending of activated carbon, conductive carbon, and/or binder is performed without the addition of any solvents, liquids, processing aids, or the like to the particle mixture. Dry-blending may be carried out, for example, for 1 to 10 minutes in a V-blender equipped with a high intensity mixing bar, until a uniform dry mixture is formed. Those skilled in the art will identify, after perusal of this document, that blending time can vary based on batch size, materials, particle size, densities, as well as other properties, and yet remain within the scope of the present invention.

Turning next to the step 125, blended dry powder material is fibrillized. In a preferred embodiment, the dry powder material is dry fibrillized (fibrillated) using non-lubricated high-shear force techniques. In a preferred embodiment, high-shear forces are provided by a jet-mill. The dry powder material is introduced into the jet-mill, wherein high-velocity air jets are directed at the dry powder material to effectuate application of high shear to the fibrillizable binder within the dry powder material. The shear forces that arise during the dry fibrillation process physically stretch the fibrillizable binder, causing the binder to form a network of fibers that bind the binder to other particles within the fibrillized material.

Although additives, such as solvents, liquids, and the like, are not necessarily used in the manufacture of certain embodiments disclosed herein, a certain amount of impurity, for example, moisture, may be absorbed by the active electrode material from the surrounding environment. Those skilled in the art will understand, after perusal of this document that the dry particles used with embodiments and processes disclosed herein may also, prior to being provided by particle manufacturers as dry particles, have themselves been preprocessed with additives and, thus, contain one or more pre-process residues. For these reasons, one or more of the embodiments and processes disclosed herein may utilize a drying step at some point before a final electrolyte impregnation step, so as to remove or reduce the aforementioned pre-process residues and impurities. It is identified that even after one or more drying steps, trace amounts of moisture, residues and impurities may be present in the active electrode material and an electrode film made therefrom.

Dry fibrillization is described in more detail in a co-pending commonly-assigned U.S. patent application Ser. No. 11/116,882. This application is hereby incorporated by reference as if fully set forth herein, including all figures, tables, and claims.

It should also be noted that references to dry-blending, dry-fibrillization, dry particles, and other dry materials and processes used in the manufacture of the active electrode material and films do not exclude the use of other than dry processes as described herein, for example, as may be achieved after drying of particles and films that may have been prepared using a processing aid, liquid, solvent, or the like.

The product obtained through the process 100 may be used to make electrode films. The films may then be bonded to a current collector, such as a foil made from aluminum or another conductor. The current collector may be pretreated prior to bonding to enhance its adhesion properties. Pretreatment of the current collector may include mechanical roughing, chemical pitting, and/or use of a surface activation treatment, such as corona discharge, active plasma, ultraviolet, laser, or high frequency treatment methods known to a person skilled in the art. In one embodiment, the electrode films may be bonded to a current collector via an intermediate layer of conductive adhesive known to those skilled in the art.

In one embodiment, the product obtained from process 100 may be mixed with a processing aid to obtain a slurry-like composition used by those skilled in the art to coat an electrode film onto a collector (i.e. a coating process). The slurry may be then deposited on one or both sides of a current collector. After a drying step, film or films of active electrode material are formed on the current collector. The current collector with the films may be calendered one or more times to densify the films and to improve adhesion of the films to the current collector.

In one embodiment, the product obtained from process 100 may be mixed with a processing aid to obtain a paste like material. The paste-like material may be then be extruded, formed into a film, and deposited on one or both sides of a current collector. After a drying step, film or films of active electrode material are formed on the current collector. The current collector with the dried films may be calendered one or more times to densify the films and to improve adhesion of the films to the current collector.

In yet another embodiment, the product obtained through the process 100 the binder particles may comprise thermoplastic or thermoset particles. The product obtained through the process 100 that includes thermoplastic or thermoset particles may be used to make electrode films. The films may then be bonded to a current collector, such as a foil made from aluminum or another conductor. The films may be bonded to a current collector in a heated calendar apparatus The current collector may be pretreated prior to bonding to enhance its adhesion properties. Pretreatment of the current collector may include mechanical roughing, chemical pitting, and/or use of a surface activation treatment, such as corona discharge, active plasma, ultraviolet, laser, or high frequency treatment methods known to a person skilled in the art.

Other methods of forming the active electrode material films and attaching the films to the current collector may also be used.

Figure 2:
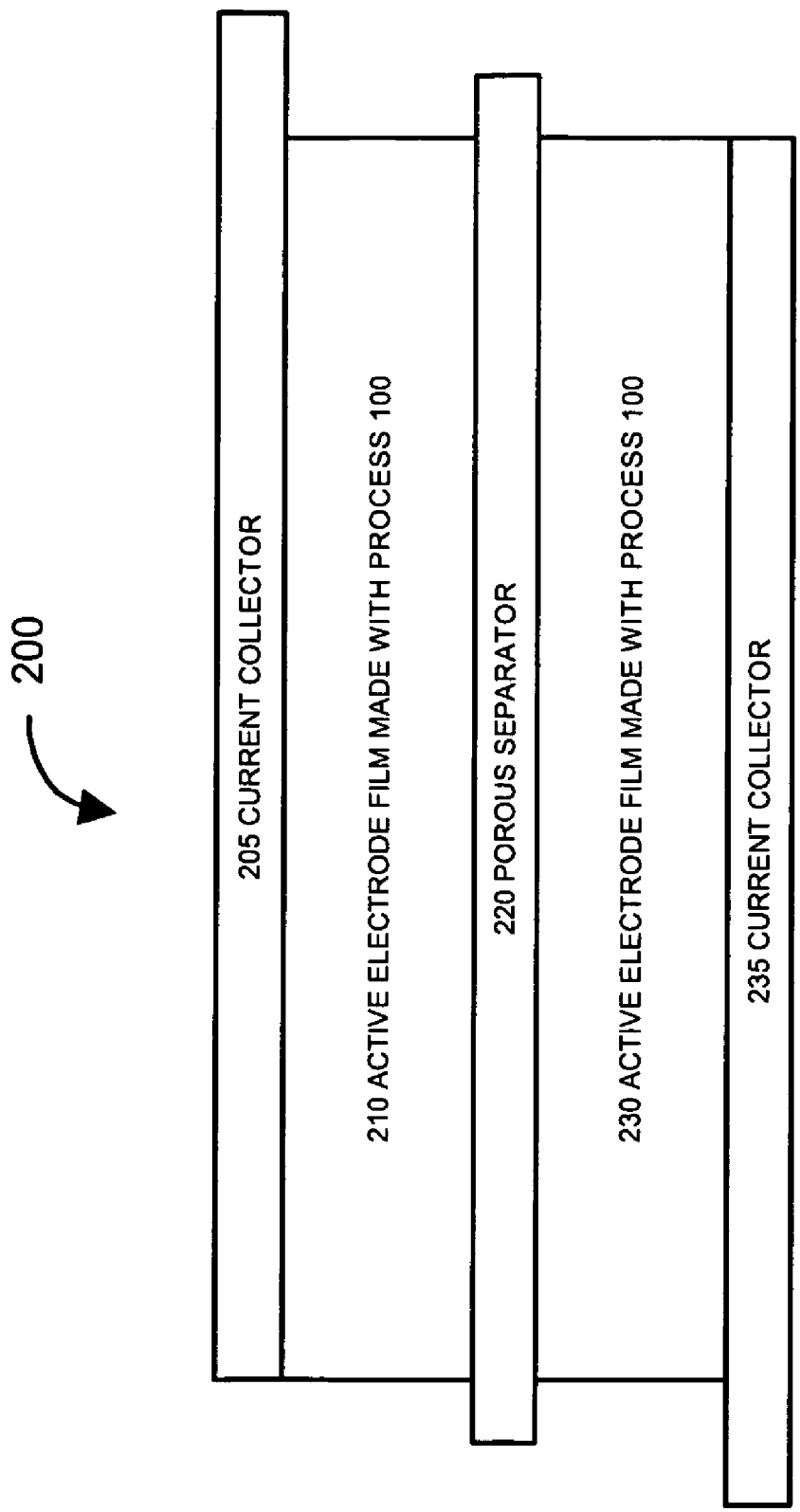
FIG. 2 illustrates, in a high-level manner, cross-section of an electrode assembly of a double layer capacitor.

FIG. 2 illustrates, in a high level manner, a cross-section of an electrode assembly 200 of a double layer capacitor. In FIG. 2, the components of the assembly 200 are arranged in the following order: (1) first current collector 205, (2) first active electrode film 210, (3) porous separator 220, (4) second active electrode film 230, and (5) second current collector 235. In a preferred embodiment, a conductive adhesive layer (not shown) is disposed on current collector 235 prior to bonding of the electrode film 210. The films 210 and 230 may be made using fibrillized particles of active electrode material obtained through the process 100 described in relation to FIG. 1. An exemplary double layer capacitor using the electrode assembly 200 further includes an electrolyte and a container, for example, a sealed can, that holds the electrolyte. The assembly 200 is disposed within the container (can) and immersed in the electrolyte.

Electrode products that include active electrode film attached to current collector and/or porous separator may be used in double layer capacitors and other electrical energy storage devices.

In one preferred embodiment, it has been identified that using process 100, wherein activated carbon with no more than about 30 ppm of chloride is used, a high performance double-layer capacitor product can be provided. Such a product further comprises about 10 percent by weight binder, and about 0.5 percent by weight conductive carbon. Such a product is exemplified by the MC2600 product available from Maxwell Technologies, Inc. 9244 Balboa Ave, San Diego, Calif. 92009. The MC2600 product is rated to provide 2600 Farads of capacitance with a decrease of less than 20% in capacitance and an increase of less than 60% in resistance over the lifetime of the product, which is rated for over 1 million duty cycles of operation at 2.7 volts. Such performance characteristics are presently not available from any prior art products.

The inventive methods for making fibrillized active electrode material, films of these material, electrodes made with the films, and double layer capacitors employing the electrodes have been described above in considerable detail. This was done for illustration purposes. Neither the specific embodiments of the invention as a whole, nor those of its features, limit the general principles underlying the invention. In particular, the invention is not necessarily limited to the specific constituent materials and proportions of constituent materials used in making the electrodes. The invention is also not necessarily limited to electrodes used in double layer capacitors, but extends to other electrode applications. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of other features. The illustrative examples therefore do not define the metes and bounds of the invention and the legal protection afforded the invention, which function is served by the claims and their equivalents.

We claim:

1. An electrode comprising:
    a current collector; and
    a film of active electrode material attached to the current collector, wherein the active electrode material comprises particles of activated carbon with a chlorine content of less than about 50 ppm; and,
    wherein the active electrode material further comprises conductive carbon particles, and wherein the proportion of the conductive carbon particles in the active electrode material is between about 0.1 percent and about 1.0 percent by weight.

2. The electrode of claim 1, wherein the active electrode material comprises binder, wherein the proportion of binder in the active electrode material is between 9 and 11 percent by weight.

3. The electrode of claim 2, wherein the proportion of the conductive carbon particles in the active electrode material is between about 0.1 percent and about 0.5 percent by weight.

4. The electrode of claim 1, wherein the chlorine content of the activated carbon is less than about 30 ppm chlorine.

5. An electrochemical double layer capacitor comprising:
- a first electrode comprising a first current collector and a first film of active electrode material, the first film comprising a first surface and a second surface, the first current collector being attached to the first surface of the first film;
- a second electrode comprising a second current collector and a second film of active electrode material, the second film comprising a third surface and a fourth surface, the second current collector being attached to the third surface of the second film;
- a porous separator disposed between the second surface of the first film and the fourth surface of the second film;
- a container;
- an electrolyte;

wherein:
- the first electrode, the second electrode, the porous separator, and the electrolyte are disposed in the container;
- the first film is at least partially immersed in the electrolyte;
- the second film is at least partially immersed in the electrolyte;
- the porous separator is at least partially immersed in the electrolyte;
- each of the first and second films comprises a mixture of activated carbon with chlorine content not exceeding about 50 parts per million; and,
- wherein the mixture of each of the first and second films further comprises conductive carbon particles, and wherein the amount of the conductive carbon particles is between about 0.1 percent and about 0.5 percent by weight.

6. The capacitor of claim 5, wherein the proportion of the conductive carbon in the mixture is less than about 0.5 percent by weight.

7. The capacitor of claim 6, wherein the electrode films further comprise binder, wherein the proportion of binder in the mixture is between about 9 percent and 11 percent by weight.

8. The capacitor of claim 5, wherein the films are attached to respective collectors via a conductive adhesive layer.

* * * * *